Jan. 1, 1946.        L. BAILLY        2,392,219
APPARATUS FOR CONCENTRATING SULPHURIC ACID AND OTHER LIQUIDS
Filed July 8, 1944
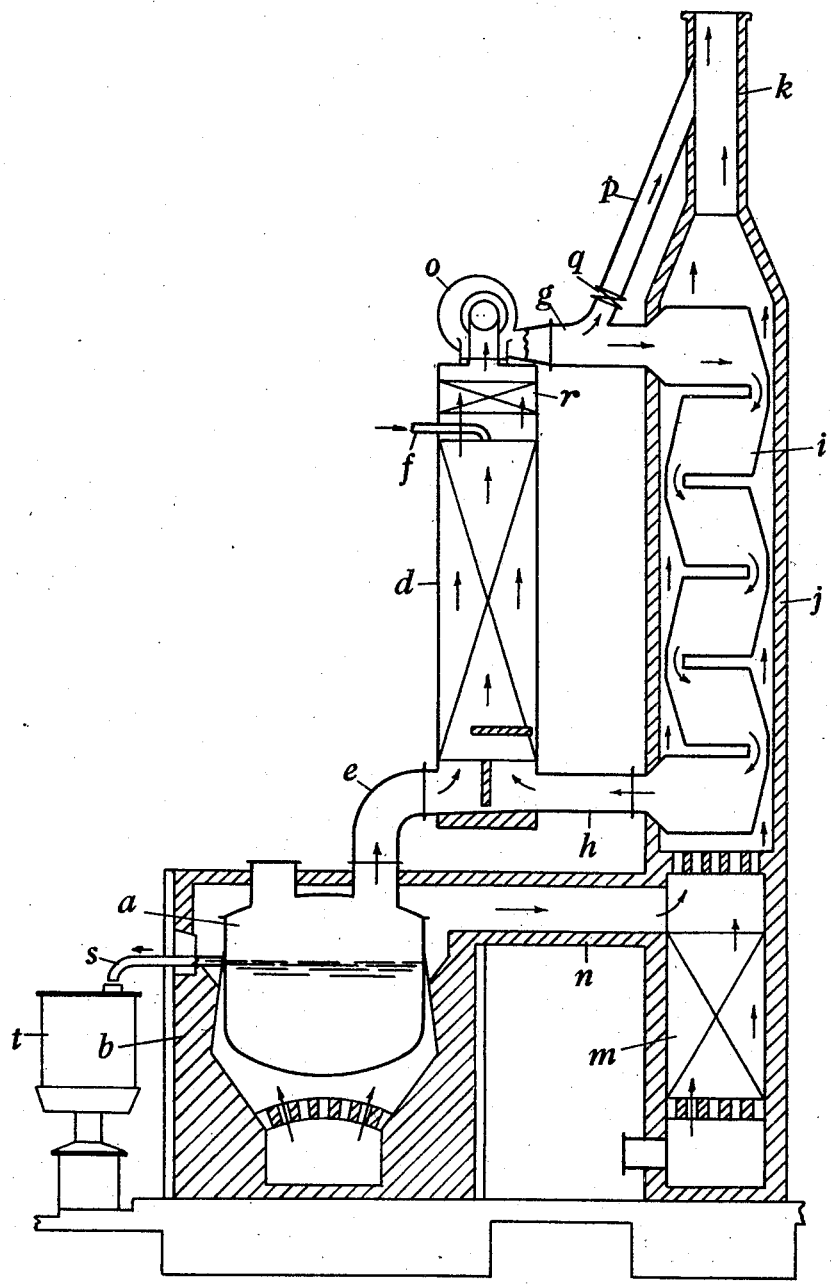
Inventor
L. Bailly
By Hancock Downing Seibold
Attys Patented Jan. 1, 1946

2,392,219

UNITED STATES PATENT OFFICE 2,392,219

APPARATUS FOR CONCENTRATING SULPHURIC ACID AND OTHER LIQUIDS

Leon Bailly, Aldridge, England, assignor to The International Furnace Equipment Company Limited, Aldridge, England Application July 8, 1944, Serial No. 544,032
In Great Britain July 12, 1943

1 Claim. (Cl. 23—263)

This invention has for its object to provide an improved apparatus for use more particularly in the concentration of sulphuric acid, but applicable also to the concentration of other liquids.

The invention comprises the combination of a still, a preliminary concentrating chamber through which the liquid to be concentrated can pass to the still and through which vapour from the still can flow in the opposite direction to the liquid, and a vapour heater connected to the ends of the preliminary concentrating chamber, the arrangement being such that vapour drawn from the said chamber can be re-heated by the heater and returned to the said chamber.

The accompanying drawing is a diagrammatic sectional side elevation of apparatus embodying the invention.

In carrying the invention into effect as shown in the drawing, I employ any convenient still $a$ of the pot type, and I mount this still in a chamber $b$ through which hot gases derived from the combustion of solid or other fuel can flow upwardly and impart the required heat to the still. At a position adjacent to and at a higher level than the still $a$ is arranged a preliminary concentrating chamber $d$ which at its lower end communicates through a duct $e$ with the upper end of the still. The sulphuric acid or other liquid to be concentrated is introduced into the preliminary concentrating chamber $d$ at or near its upper end by a pipe $f$, and while flowing downwardly through this chamber to the duct $e$ leading to the still $a$ the liquid is brought into intimate contact with vapour passing upwardly through the chamber from the still, the chamber being fitted internally with any convenient means for ensuring the desired intimacy of contact between the liquid and vapour. The upper and lower ends of the preliminary concentrating chamber are connected by ducts $g$, $h$ to opposite ends of a vapour heater $i$ which is adapted to be heated by hot gases derived from the still chamber $b$ or from the independent combustion of solid or other fuel. In the example shown the vapour heater $i$ is arranged in a vertical chamber $j$ which at its upper end is provided with a chimney $k$, and which near its lower end contains any convenient heat accumulator $m$ through which hot gases from an independent grate or burner can flow before coming into contact with the vapour heater. Also, at a position above the accumulator $m$, the chamber $j$ containing the vapour heater $i$ is connected to the upper end of the chamber $b$ containing the still $a$ by a duct $n$ through which hot gases from the still chamber can flow to the vapour heater chamber and thence to the chimney $k$. The hot gases flowing to the vapour heater chamber $j$ from the still chamber $b$ can be supplemented by hot gases from the accumulator $m$. Instead of being heated from two independent sources as above described the vapour heater $i$ may be heated from only one such source if desired. To effect the required circulation of vapour through the preliminary concentrating chamber $d$ and the vapour heater $i$ a fan or blower $o$ is provided in association with and preferably at the upper or outlet end of the said chamber.

The mode of operation of the apparatus above described is as follows:

From the sulphuric acid (or other liquid) in the still $a$, vapour (consisting of a mixture of sulphuric acid and water vapour) is driven off, leaving concentrated liquid in the still. The vapour passes from the still $a$ to the lower end of the preliminary concentrating chamber $d$ and then upwardly through this chamber where it meets and becomes intimately mixed with a downward flow of the liquid to be concentrated, this liquid being supplied by the pipe $f$. Some of the heat of the vapour is imparted to the liquid causing evaporation of a part of the aqueous content of the liquid. On leaving the chamber $d$ the vapour passes through the fan or blower $o$ and is impelled thereby to the entrance of the vapour heater $i$, surplus vapour being at this point discharged to the chimney $k$ through a passage $p$ controlled by a damper $q$. If desired the vapour flowing from the preliminary concentrating chamber $d$ to the vapour heater $i$ may pass through any convenient drier, separator, or precipitator $r$ which in the example shown is combined with the upper end of the said chamber. The vapour supplied to the heater $i$ is therein heated to any convenient temperature and on leaving the heater is returned to the lower end of the preliminary concentrating chamber $d$, where it again passes upwardly through that chamber, the required partial concentration of the liquid (which may be the greater part of the desired concentration) being effected by the heat derived in part from the vapour given off in the still and in part by the vapour circulated through the vapour heater.

The partially concentrated liquid passes to the still $a$ where the concentrating process is completed. The concentrated liquid is withdrawn from the still $a$ and conducted by a pipe $s$ to a cooler $t$ or to a storage receptacle or receptacles.

By means of my invention I am able to obtain with a pot-still of given capacity an increased output with economy of heating fuel. The invention is not, however, limited to the example above described as the form and arrangement of the parts may be varied to suit requirements.

Having thus described my invention what I claim as new and desire to secure by Letters Patent is:

Apparatus for concentrating liquid, such as sulphuric acid, comprising in combination a still, a preliminary concentrating chamber arranged at a higher level than the still, an inlet for admitting dilute liquid to the upper portion of said chamber, a conduit connecting the lower portion of said chamber to the vapour space of said still, a vapour heater, a vapour connection between the upper ends of said chamber and heater, another vapour connection between the lower ends of said chamber and heater, and means for circulating vapour from the upper portion of said chamber through said heater and back to the lower portion of said chamber.

LEON BAILLY.